US011731719B2

(12) United States Patent
Grove (10) Patent No.: US 11,731,719 B2
(45) Date of Patent: Aug. 22, 2023

(54) TELESCOPING CEILING MOUNTED STORAGE OR BIKE RACK

(71) Applicant: Hurricane Merchants LLC, Waxhaw, NC (US)

(72) Inventor: Timothy P. Grove, Waxhaw, NC (US)

(*) Notice: Subject to any disclaimer, the term of this patent is extended or adjusted under 35 U.S.C. 154(b) by 363 days.

(21) Appl. No.: 17/133,963

(22) Filed: Dec. 24, 2020

(65) Prior Publication Data

US 2021/0245824 A1 Aug. 12, 2021

Related U.S. Application Data

(60) Provisional application No. 62/975,275, filed on Feb. 12, 2020.

(51) Int. Cl.
*B62H 3/12* (2006.01)

(52) U.S. Cl.
CPC ...................... *B62H 3/12* (2013.01)

(58) Field of Classification Search
CPC ... B62H 3/12; B62H 3/08; B62H 3/04; B62H 3/02; B62H 3/00; B62H 3/10; B62H 2700/00; A47B 96/1425; B25H 1/0014; A47F 5/0892; E04H 6/005
USPC ........................................... 211/17–20, 22, 5
See application file for complete search history.

(56) References Cited

U.S. PATENT DOCUMENTS

| | | | | |
|---|---|---|---|---|
| 1,178,343 A * | 4/1916 | Payne | ................... | A47G 25/743 211/115 |
| 4,116,341 A * | 9/1978 | Hebda | ................... | B60R 9/06 224/532 |
| 4,431,108 A * | 2/1984 | Lee | ................... | A47F 7/24 211/113 |
| 4,813,550 A * | 3/1989 | Saeks | ................... | B62H 3/12 211/208 |
| 4,840,278 A * | 6/1989 | Gelinas | ................... | B62H 3/12 211/20 |
| 5,056,753 A * | 10/1991 | Lunau | ................... | E04G 21/1808 248/200.1 |
| 5,086,930 A * | 2/1992 | Saeks | ................... | B62H 3/12 248/161 |
| 5,294,066 A | 3/1994 | Lacour | | |
| 5,575,567 A | 11/1996 | Brown | | |
| 5,664,687 A * | 9/1997 | Liatti | ................... | B62H 3/12 211/17 |

(Continued)

*Primary Examiner* — Hiwot E Tefera
(74) *Attorney, Agent, or Firm* — Jeffrey C. Watson; Grell & Watson Patent Attorneys LLC (57) ABSTRACT

A telescoping ceiling mounted storage rack include a ceiling mount, a first down-post section, a second down-post section, raising and lowering mechanism, and at least one mounting bracket. The ceiling mount is configured to attach to a ceiling and support a payload from the ceiling. The first down-post section attached to the ceiling mount. The second down-post section telescopically configured with the first down-post section, where the second down-post section is configured to slide up and down about the first down-post section attached to the ceiling mount. The raising and lowering mechanism is configured to move the second down-post section between a lowered position telescopically extended from the first down-post section and a raised position telescopically recessed on or in the first down-post section. The at least one mounting bracket is attached to the second down-post section and is configured to hold the payload.

17 Claims, 7 Drawing Sheets

(56) References Cited

U.S. PATENT DOCUMENTS

| | | | |
|---|---|---|---|
| 5,772,048 A | 6/1998 | Sopcisak | |
| 6,095,344 A * | 8/2000 | White | B62H 3/12 |
| | | | 211/21 |
| 6,164,459 A | 12/2000 | Liem | |
| 6,237,781 B1 | 5/2001 | Dahl | |
| 6,691,878 B1 | 2/2004 | Ouitz | |
| 8,437,873 B2 | 5/2013 | North | |
| 8,662,324 B2 * | 3/2014 | Robinson | A61J 9/0684 |
| | | | 211/126.5 |
| 8,757,397 B2 | 6/2014 | Shaha et al. | |
| 8,893,898 B2 | 11/2014 | Dovner | |
| 9,004,295 B2 | 4/2015 | Dovner | |
| 2004/0050807 A1 * | 3/2004 | Cheng | B62H 3/12 |
| | | | 211/171 |
| 2007/0029267 A1 | 2/2007 | Hall et al. | |
| 2016/0069480 A1 * | 3/2016 | Rego | F16G 11/146 |
| | | | 248/65 |
| 2020/0353611 A1 * | 11/2020 | Smith | B25H 1/0014 |

* cited by examiner

TELESCOPING CEILING MOUNTED STORAGE OR BIKE RACK

CROSS-REFERENCE TO RELATED APPLICATIONS

This application claims the priority benefit of U.S. Provisional Application No. 62/975,275, filed on Feb. 12, 2020, entitled "Telescoping Ceiling Mounted Bike and/or Storage Rack", which is incorporated by reference herein in its entirety.

FIELD OF THE DISCLOSURE

The present disclosure is related to light payload utility storage. More particularly, the present disclosure relates to a storage device that uses multiple mechanical means to raise a payload and lower it as well, all from a fixed position, like on the ceiling of a garage or shop. Namely, the present disclosure relates to a telescoping ceiling mounted bike rack or storage rack that uses a mechanical means to raise and lower a payload that could be motorized or left mechanical.

BACKGROUND

Generally speaking, storage racks, or storage systems, are devises used to store items or payloads, like in a garage or shed, that typically elevate the items or payloads off of the ground. Storage racks and systems are designed to help organize items and payloads and to keep the area where they are stored neat and tidy. There are many different shapes and sizes of storage racks and systems. For example, in a garage (which is clearly not just for storing your car anymore) or a shed, storage containers like totes and baskets as well as garage cabinets, hooks, garage racks, pegboards and wall panels provide other storage options.

Because most of such storage racks or systems require the payload to be stored off of the ground, the instant disclosure recognizes the difficulty in lifting such payloads to the height required for storage. This may be especially true for high ceiling areas where tall shelving or cabinets may be provided or where ceiling mounted storage racks may be installed. Thus, there is clearly a need to provide a storage rack or system that makes lifting the payload to the desired storage height easier.

A bicycle parking rack, usually shortened to bike rack and also called a bicycle stand, is a form of a storage rack or system that is a device to which bicycles can be securely attached for parking purposes. A bike rack may be free standing or it may be securely attached to the ground or some stationary object such as a building. Indoor bike racks are commonly used for private bicycle parking, while outdoor bike racks are often used in commercial areas. Bike racks can be constructed from a number of different materials. Durability, weather resistance, appearance, and functionality are extremely important variables of the material of the bike rack. Construction materials include stainless steel, steel, recycled plastic, or thermoplastic. Each material has advantages and disadvantages, and each is unique in appearance from the others. The visibility of the bike rack, adequate spacing from automobile parking and pedestrian traffic, weather coverage, and proximity to destinations are all important factors determining usefulness of a bicycle rack. These factors will help increase usage of the bike rack, and assure cyclists their bike is securely parked.

Ceiling mounted bike racks and storage systems are known for use in garages in sheds. These types of ceiling mounted bike racks include fixed hooks or pulley type systems that lift the bike into the air. The instant disclosure recognizes the difficulty of using such ceiling mounted systems. Thus, there is clearly a need to provide a ceiling mounted bike rack and system that is easier to operate The instant disclosure may be designed to address at least certain aspects of the problems or needs discussed above by providing a telescoping ceiling mounted storage or bike rack.

SUMMARY

The present disclosure solves the aforementioned limitations of the currently available storage devices by providing a telescoping ceiling mounted storage rack, including, but not limited to, a telescoping ceiling mounted bike rack. The telescoping ceiling mounted storage rack may include a ceiling mount, a first down-post section, a second down-post section, a raising and lowering mechanism, and at least one mounting bracket. The ceiling mount may be configured to attach to a ceiling and support a payload from the ceiling. The first down-post section may be attached to the ceiling mount. The second down-post section may be telescopically configured with the first down-post section, where the second down-post section may be configured to slide up and down about the first down-post section attached to the ceiling mount. The raising and lowering mechanism may be configured to move the second down-post section between a lowered position telescopically extended from the first down-post section and a raised position telescopically recessed on or in the first down-post section. The at least one mounting bracket may be attached to the second down-post section and may be configured to hold the payload. In use, when the payload is held on the at least one mounting bracket, the telescoping ceiling mounted storage rack may be configured to move the payload between the lowered position and the raised position. The lowered position may be farther away from the ceiling than the raised position and the raised position may be closer to the ceiling than the lowered position.

In select embodiments of the disclosed ceiling mounted storage or bike rack the raising and lowering mechanism may include a threaded rod. The threaded rod may be configured to move the second down-post section between the lowered position telescopically extended from the first down-post section and the raised position telescopically recessed on or in the first down-post section. The threaded rod may be attached to a fixed bottom end of the second down-post section. The threaded rod may be configured to freely rotate within the fixed bottom end of the second down-post section. The threaded rod may be configured to engage a threaded bottom end of the first down-post section. Wherein, when the threaded rod is rotated, the threaded bottom end of the first down-post may be configured to move along the threaded rod. Whereby, when the threaded rod is rotated in a first direction, the second down-post section may be configured to telescopically extend from the first down-post section. In reverse, when the threaded rod is rotated in an opposite second direction, the second down-post section may be configured to telescopically recess onto the first down-post section.

One feature of the disclosed ceiling mounted storage or bike rack may be that the raising and lowering mechanism can include a drive mechanism. The drive mechanism may be configured to rotate the threaded rod in both the first direction and the opposite second direction. Whereby, the drive mechanism may be configured for moving the payload between the lowered position and the raised position. In select embodiments, the drive mechanism may include a motor. The motor of the drive mechanism may include a power source including a wired powered source, a battery powered source, or a combination thereof. In other select embodiments, the drive mechanism may include a manually operated mechanism.

In select embodiments of the disclosed ceiling mounted storage or bike rack, the raising and lowering mechanism may include the motor and a motor mount. The motor may be configured to rotate the threaded rod in both the first direction and the opposite second direction. Whereby the motor may be configured for moving the payload between the lowered position and the raised position. The motor mount may be configured to house and mount the motor to rotate the threaded rod. The motor mount may include an upward mounting bar extending upward from the motor mount. The upward mounting bar may be configured to be attached to a mounting receptacle attached to the second down-post section approximate the fixed bottom end of the second down-post section. The upward mounting bar may extend into an open bottom of the mounting receptacle. In select embodiments, the motor mount may include a first gear, a second gear and a third gear. The first gear may be attached to the motor, the third gear may be attached to the threaded rod, and the second gear may be positioned between the first gear and the third gear, where the second gear may be configured for translating rotation from the motor to the threaded rod via the first gear and the third gear.

Another feature of the disclosed telescoping ceiling mounted storage or bike rack may be the inclusion of four mounting receptacles. In select embodiments, the second down-post section can include the four mounting receptacles attached around the second down-post section near the fixed bottom end. Whereby the motor mount may be configured to be mounted in any of the four mounting receptacles for positioning the motor on any side of the second down-post section via the upward mounting bar extending into the open bottom of any of the four mounting receptacles.

Another feature of the disclosed telescoping ceiling mounted storage or bike rack may be that each of the at least one mounting brackets may be configured for holding at least one bike. In select embodiments, the disclosed telescoping ceiling mounted storage or bike rack may include two mounting brackets, wherein each of the two mounting brackets are configured to hold two bikes. Whereby, the telescoping ceiling mounted storage rack may be configured to hold four bikes.

In select embodiments of the disclosed telescoping ceiling mounted storage or bike rack, the at least one mounting brackets may include at least one rounded bracket arm. Each of the at least one rounded bracket arms may be configured to hold at least one bike in a vertical position. In select embodiments, each of the at least one rounded bracket arms may include a horizontal center rod, a downward mounting bar, and a tubular surface. The downward mounting bar may be attached to a mounting end of the horizontal center rod. The downward mounting bar may be configured to mount the rounded bracket arm into one of the mounting receptacles on the second down-post section. The tubular surface may be positioned over the horizontal center rod configured for holding the at least one bike thereon safely without scratching the at least one bike held thereon.

In select embodiments of the disclosed telescoping ceiling mounted storage or bike rack, the at least one mounting brackets may include at least one j-hook bracket. Each of the at least one j-hook brackets may include a pair of adjustable j-hooks for each of the at least one bikes. Wherein, each of the at least one j-hook brackets may be configured to hold the at least one bikes in a horizontal position. In select embodiments, each of the at least one j-hook brackets may include a horizontal support bar, the downward mounting bar, and at least one transverse horizontal bar. The downward mounting bar may be attached to a mounting end of the horizontal support bar. The downward mounting bar may be configured to mount the j-hook bracket into one of the mounting receptacle on the second down-post section. The at least one transverse horizontal bar may be provided for each bike mounted on the at least one j-hook bracket. Each of the at least one transverse horizontal bars may include a center opening, a plurality of holes, a first j-hook, and a second j-hook. The center opening may be configured to receive the horizontal support bar. Whereby, each of the transverse horizontal bars may move along said horizontal support bar. The plurality of holes may be on each side of the center opening. The first j-hook may be configured to be attached to one of the plurality of holes on a left side of the center opening. The second j-hook may be configured to be attached to one of the plurality of holes on a right side of the center opening. Whereby, each of the at least one j-hook brackets may be adjustable by adjusting a width between the first j-hook and the second j-hook, by adjusting a distance between a first transvers horizontal bar and a second transverse horizontal bar, or combinations thereof.

Another feature of the disclosed telescoping ceiling mounted storage or bike rack may be that the second down-post section can include the four mounting receptacles. The four mounting receptacles may be attached around the second down-post section near a fixed bottom end. Each of the at least one mounting brackets may include the downward mounting bars configured to be mounted in an open top of any of the four mounting receptacles for positioning each of the at least one mounting brackets on any side of the second down-post section. In select embodiments, the second down-post section may include a square shaped cross-section. Wherein each of the four mounting receptacles may be positioned on each side of the square shaped cross-section of the second down-post section. With this configuration, the ceiling mounted storage rack may include two mounting brackets positioned on opposite sides of the square shaped cross-section of the second down-post section via two of the four mounting receptacles, and the raising and lowering mechanism may be mounted to one of the other two mounting receptacles.

In select embodiments of the disclosed telescoping ceiling mounted storage or bike rack, the ceiling mount may include a flat plate and a ceiling receptacle. The flat plate may have a plurality of mounting holes configured for attaching the ceiling mount to the ceiling. The ceiling receptacle may be attached to the flat plate approximate its center. The ceiling receptacle may be configured to receive and attach the first down-post section to the ceiling mount. In select embodiments, the flat plate of the ceiling mount may include a center plate including the ceiling receptacle attached thereto and four of the mounting holes approximate each corner of the center plate. Center plate may include a ceiling receptacle attached thereto and four of the mounting holes approximate each corner of the center plate. In other select embodiments, the ceiling mount may include a stud plate. The stud plate may be configured to be attached between studs in the ceiling. The stud plate may include two of the mounting holes on a first side and two of the mounting holes on a second side. A first rigid L-beam member may be attached on a first edge of the stud plate. A second rigid L-beam member may be attached on a second edge of the stud plate. Wherein, when the stud plate is attached to the ceiling via its four mounting holes, the center plate may be configured to be mounted to the ceiling by inserting the center plate between the first rigid L-beam member and the second rigid L-beam member at the first side or the second side of the stud plate. The center plate may then be slid along the first rigid L-beam member and the second L-beam member into a desired position, where the center plate may be attached in the desired position via the mounting holes on the center plate.

In another aspect, the instant disclosure embraces the telescoping ceiling mounted storage rack in any of the various embodiments and/or combination of embodiments shown and/or described herein. In select embodiments, the ceiling mounted storage rack may include at least two first down-post sections attached to a ceiling. A second down-post section may be telescopically configured with each of the first down-post sections. The second down-post sections may be configured to slide up and down about the first down-post sections attached to the ceiling. The raising and lowering mechanism may be configured to move the second down-post sections between a lowered position telescopically extended from the first down-post sections and a raised position telescopically recessed on or in the first down-post section. In select embodiments, the raising and lowering mechanism may include threaded rods configured to move the second down-post sections between the lowered position telescopically extended from the first down-post sections and the raised position telescopically recessed on or in the first down-post sections. Each of the threaded rods may be attached to a fixed bottom end of the second down-post section, where the threaded rod may be configured to freely rotate within the fixed bottom end of the second down-post section. Each of the threaded rods may be configured to engage a threaded bottom end of the first down-post section. Wherein, when the threaded rod is rotated, the threaded bottom end of the first down-post may be configured to move along the threaded rod. Whereby, when each of the threaded rods is rotated in a first direction, the second down-post sections may be configured to telescopically extend from the first down-post sections. And in reverse, when each of the threaded rods is rotated in an opposite second direction, the second down-post sections may be configured to telescopically recess onto the first down-post sections.

In another aspect, the instant disclosure embraces a telescoping ceiling mounted bike rack in any of the various embodiments and/or combination of embodiments shown and/or described herein.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-7, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples. The present disclosure may solve the aforementioned limitations of the currently available devices and methods of storage by providing telescoping ceiling mounted storage or bike rack 10. Telescoping ceiling mounted storage or bike rack 10 may be used for storing any type of payload 16, including, but not limited to bikes 66, as shown in the Figures. However, the disclosure is not so limited, and the telescoping ceiling mount may be used and designed for other payloads 16, including, but not limited to, for using multiple telescoping ceiling mounts together to create ceiling mounted storage racks, the like, etc.

The present disclosure solves the aforementioned limitations of the currently available storage devices by providing telescoping ceiling mounted storage rack 10 including, but not limited to, telescoping ceiling mounted bike rack 10, as shown in the Figures. Telescoping ceiling mounted storage rack 10 may generally include ceiling mount 12, first down-post section 18, second down-post section 20, raising and lowering mechanism 22, and at least one mounting bracket 28. These components are described in greater detail below.

First down-post section 18 may be included with telescoping ceiling mounted storage or bike rack 10. See FIGS. 1-7. First down-post section 18 may be the upper fixed portion of the telescoping aspect of telescoping ceiling mounted storage or bike rack 10. First down-post section 18 may be attached to ceiling mount 12.

Second down-post section 20 may be included with telescoping ceiling mounted storage or bike rack 10. See FIGS. 1-7. Second down-post section 20 may be the lower movable portion of the telescoping aspect of telescoping ceiling mounted storage or bike rack 10. As such, second down-post section 20 may be telescopically configured with first down-post section 18. Second down-post section 20 may be configured to slide up and down about first down-post section 18 attached to ceiling mount 12.

Raising and lower mechanism 22 may be included with telescoping ceiling mounted storage or bike rack 10. See FIGS. 1-7. Raising and lowering mechanism 22 may be configured to move second down-post section 20 between lowered position 24 telescopically extended from first down-post section 18 (see FIG. 2B) and raised position 26 telescopically recessed on or in first down-post section 18 (see FIG. 2A). Lowered position 24 may be farther away from ceiling 14 than raised position 26. Likewise, in other words, raised position 26 may be closer to ceiling 14 than lowered position 24.

At least one mounting bracket 28 may be may be included with telescoping ceiling mounted storage or bike rack 10. See FIGS. 1-2 and 4-7. Mounting brackets 28 may be designed and configured to hold payload 16, including, but not limited to bike or bikes 66. Mounting brackets 28 may be designed, shaped, sized and/or configured to hold any type of payload 16. Each of the mounting brackets 28 may be attached to second down-post section 20 and may be configured to hold payload 16, like bikes 66. In use, when payload 16 (like bikes 66) is held on the at least one mounting bracket 28, telescoping ceiling mounted storage or bike rack 10 may be configured to move payload 16 between lowered position 24 (see FIG. 2B) and raised position 26 (see FIG. 2A).

Figure 3:
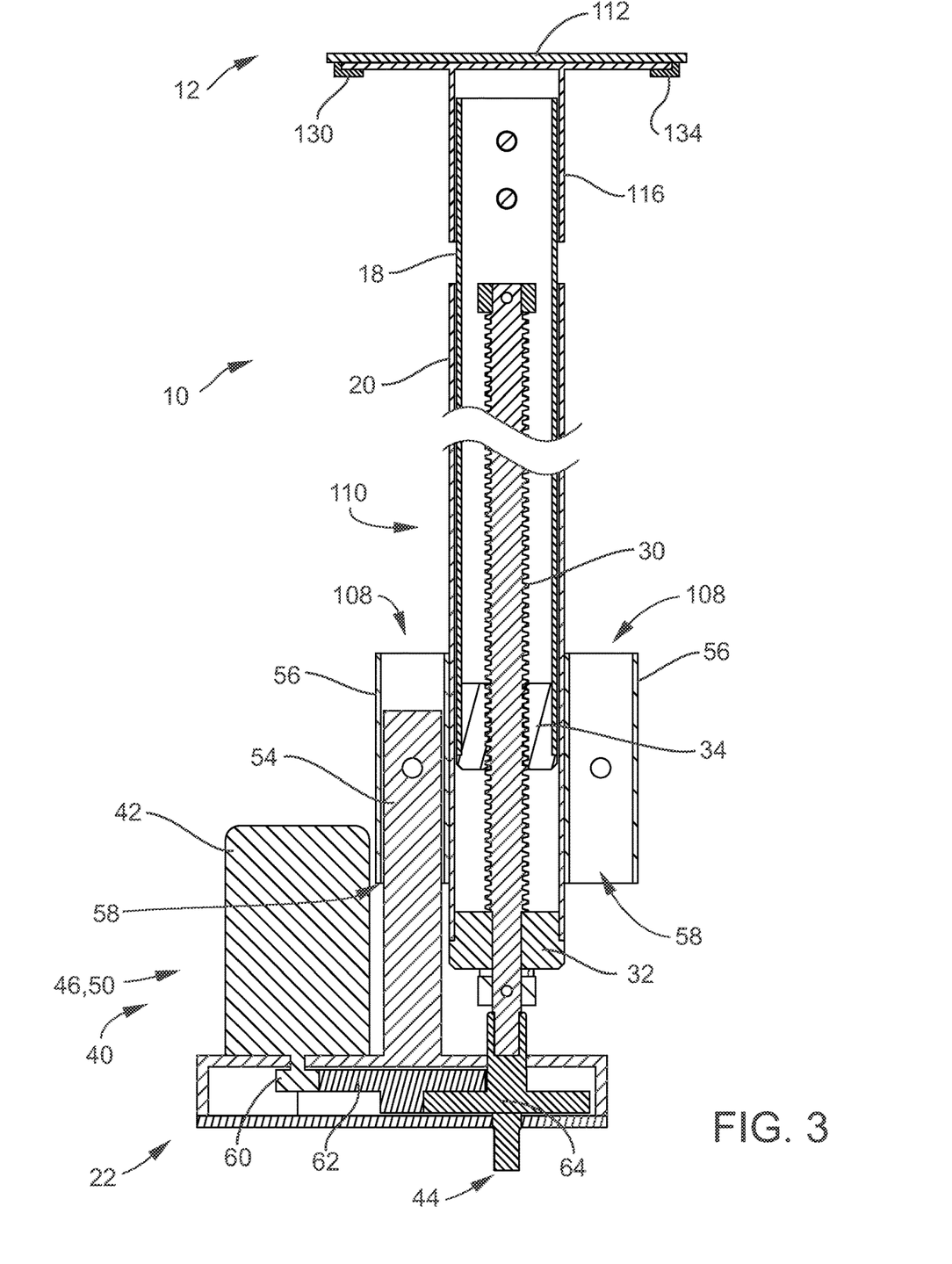
FIG. 3 is a side cross-sectional view of the telescoping ceiling mounted storage or bike rack of FIG. 1.
Figure 6:
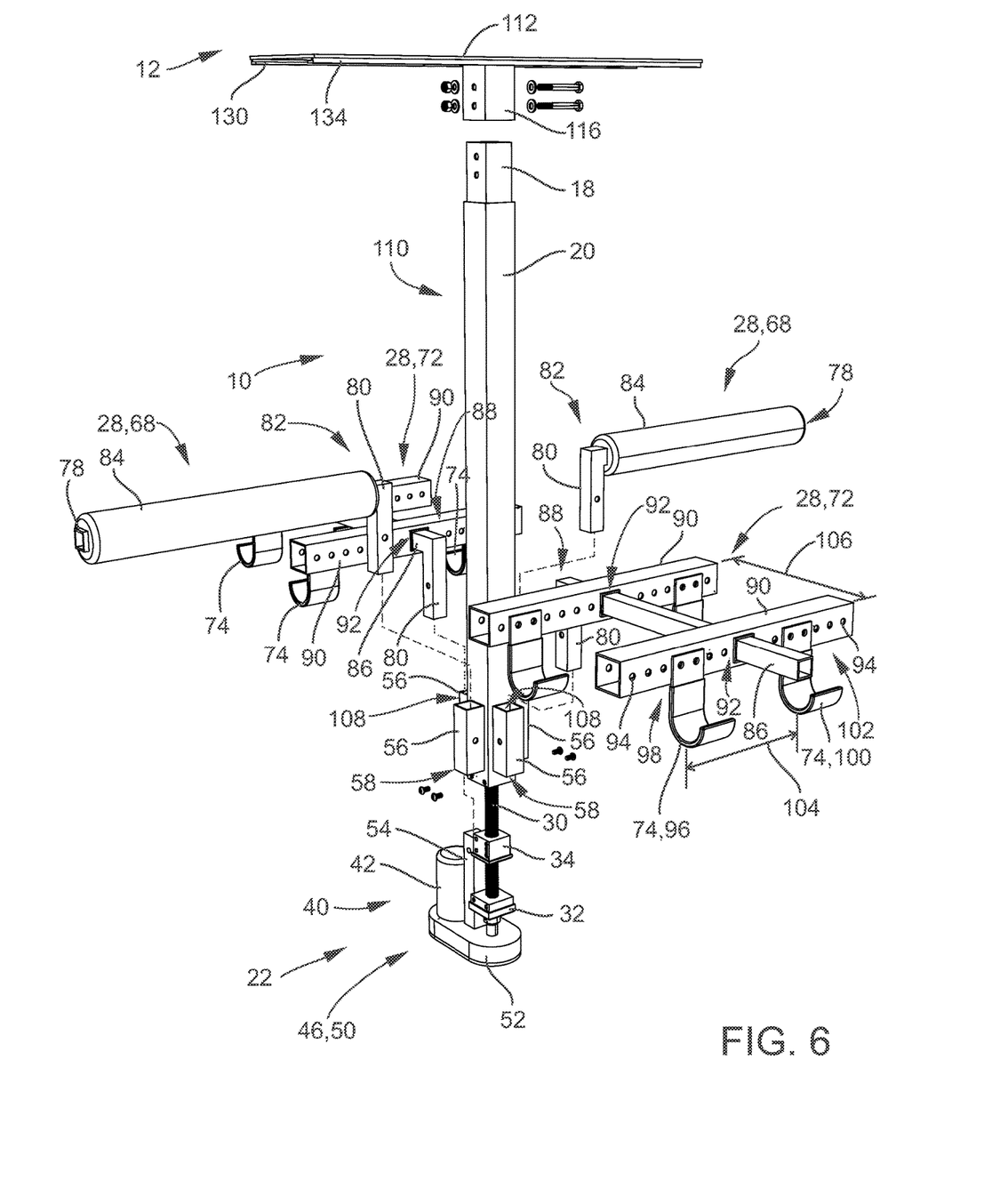
FIG. 6 is a front perspective view of the telescoping ceiling mounted storage or bike rack according to select embodiments of the instant disclosure showing various optional mounting pieces.

Referring now specifically to FIG. 3, in select embodiments of ceiling mounted storage or bike rack 10, raising and lowering mechanism 22 may include threaded rod 30. Threaded rod 30 may be for moving or operating the telescoping feature of ceiling mounted storage or bike rack 10 via second down-post section 20 moving telescopically about first down-post section 18. As such, threaded rod 30 may be configured to move second down-post section 20 between lowered position 24 telescopically extended from first down-post section 18 and raised position 26 telescopically recessed on or in first down-post section 18. Threaded rod 30 may be attached to fixed bottom end 32 of second down-post section 20, as best shown in FIGS. 3 and 6. Threaded rod 30 may be configured to freely rotate within fixed bottom end 32 of second down-post section 20 while maintaining its position in fixed bottom end 32. Threaded rod 30 may be configured to engage threaded bottom end 34 of first down-post section 18. Wherein, when threaded rod 30 is rotated, threaded bottom end 34 of first down-post 18 may be configured to move along threaded rod 30, thereby moving first down-post section 18. Whereby, when threaded rod 30 is rotated in first direction 36 (see FIG. 2A), second down-post section 20 may be configured to telescopically extend from first down-post section 18. In reverse, when threaded rod 30 is rotated in opposite second direction 38, second down-post section 20 may be configured to telescopically recess onto first down-post section 18.

Referring again to FIG. 3, another feature of ceiling mounted storage or bike rack 10 may be that raising and lowering mechanism 22 can include drive mechanism 40. Drive mechanism 40 may be for providing the energy or power to move ceiling mounted storage or bike rack 10 with payload 16 between raised position 26 and lowered position 24. As such, drive mechanism 40 may be configured to rotate threaded rod 30 in both first direction 36 and opposite second direction 38. Whereby, drive mechanism 40 may be configured for moving payload 16 between lowered position 24 and raised position 26. In select embodiments, drive mechanism 40 may include, but is not limited to, electric motor 42. Motor 42 of drive mechanism 40 may include power source 46 including wired powered source (not shown in drawings), battery powered source 50, the like, or a combination thereof. In other select embodiments, drive mechanism 40 may include manually operated mechanism 44. Manually operated mechanism 44 may be configured to manually rotate threaded rod 30, like via a wrench, hand crank, or the like. In other select embodiments, as shown in the Figures, ceiling mounted storage or bike rack 10 may include a combination of motor 42 and manually operated mechanism 44.

Referring now to FIGS. 1-7, and as best shown in FIG. 3, in select embodiments of ceiling mounted storage or bike rack 10, raising and lowering mechanism 22 may include motor 42 and motor mount 52. As discussed above, motor 42 may be configured to rotate threaded rod 30 in both first direction 36 and opposite second direction 38. Whereby, motor 42 may be configured for moving payload 16 between lowered position 24 and raised position 26. Motor mount 52 may be configured to house and mount motor 42 to rotate threaded rod 30. Motor mount 52 may include upward mounting bar 54 extending upward from motor mount 52. Upward mounting bar 54 may be configured to be attached to mounting receptacle 56 attached to second down-post section 20 approximate bottom end 32 of second down-post section 20. Upward mounting bar 54 may extend into open bottom 58 of one of the mounting receptacles 56 on second down-post section 20. In select embodiments, as shown in FIG. 3, motor mount 52 may include first gear 60, second gear 62, and third gear 64. First gear 60 may be attached to motor 42 (like via a drive shaft), third gear 64 may be attached to threaded rod 30, and second gear 62 may be positioned between first gear 60 and third gear 64, where second gear 62 may be configured for translating rotation from motor 42 to threaded rod 30 via first gear 60 and third gear 64, respectively.

Referring to FIGS. 1-7, another feature of telescoping ceiling mounted storage or bike rack 10 may be the inclusion of multiple mounting receptacles 56. Mounting receptacles 56 may be configured for mounting or connecting mounting brackets 28 around second down-post section 20 at different angles and configurations. Mounting receptacles 56 may also be configured for mounting or connecting motor mount 52 around second down-post section 20 at different angles and configurations. In select embodiments, second down-post section 20 can include four mounting receptacles 56 attached around second down-post section 20 near fixed bottom end 32. Whereby, motor mount 52 may be configured to be mounted in open bottom 58 of any of the four mounting receptacles 56 for positioning motor 42 on any side of second down-post section 20 via upward mounting bar 54 extending into the open bottom 58 of any of the four mounting receptacles 56.

Figure 4:
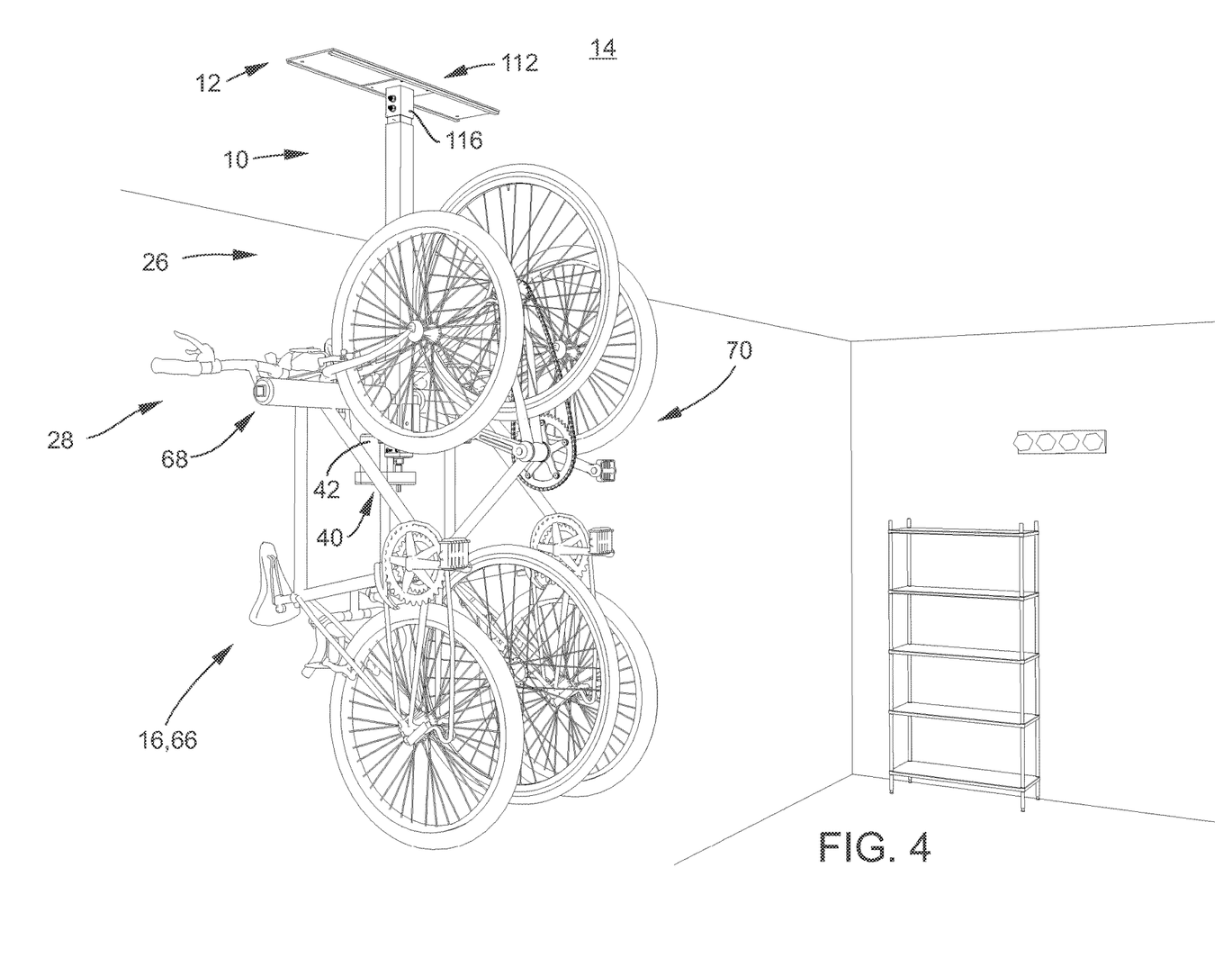
FIG. 4 is an environmental perspective view of the telescoping ceiling mounted storage or bike rack according to select embodiments of the instant disclosure with bar mounting pieces hung on a ceiling with bikes stored thereon.
Figure 5:
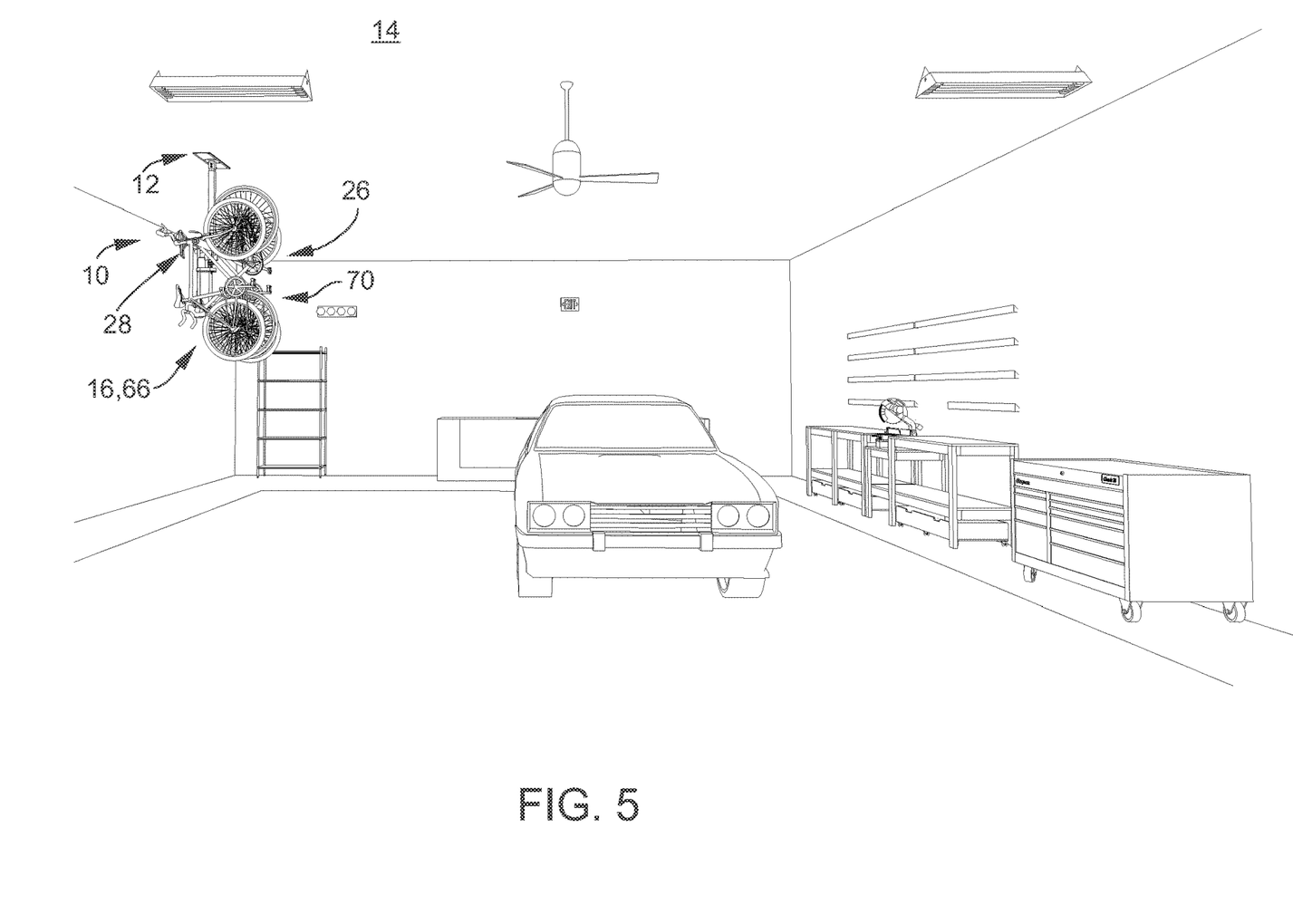
FIG. 5 is an environmental perspective view of the telescoping ceiling mounted storage or bike rack according to select embodiments of the instant disclosure with bar mounting pieces hung on a ceiling of a garage with bikes stored thereon.
Figure 7:
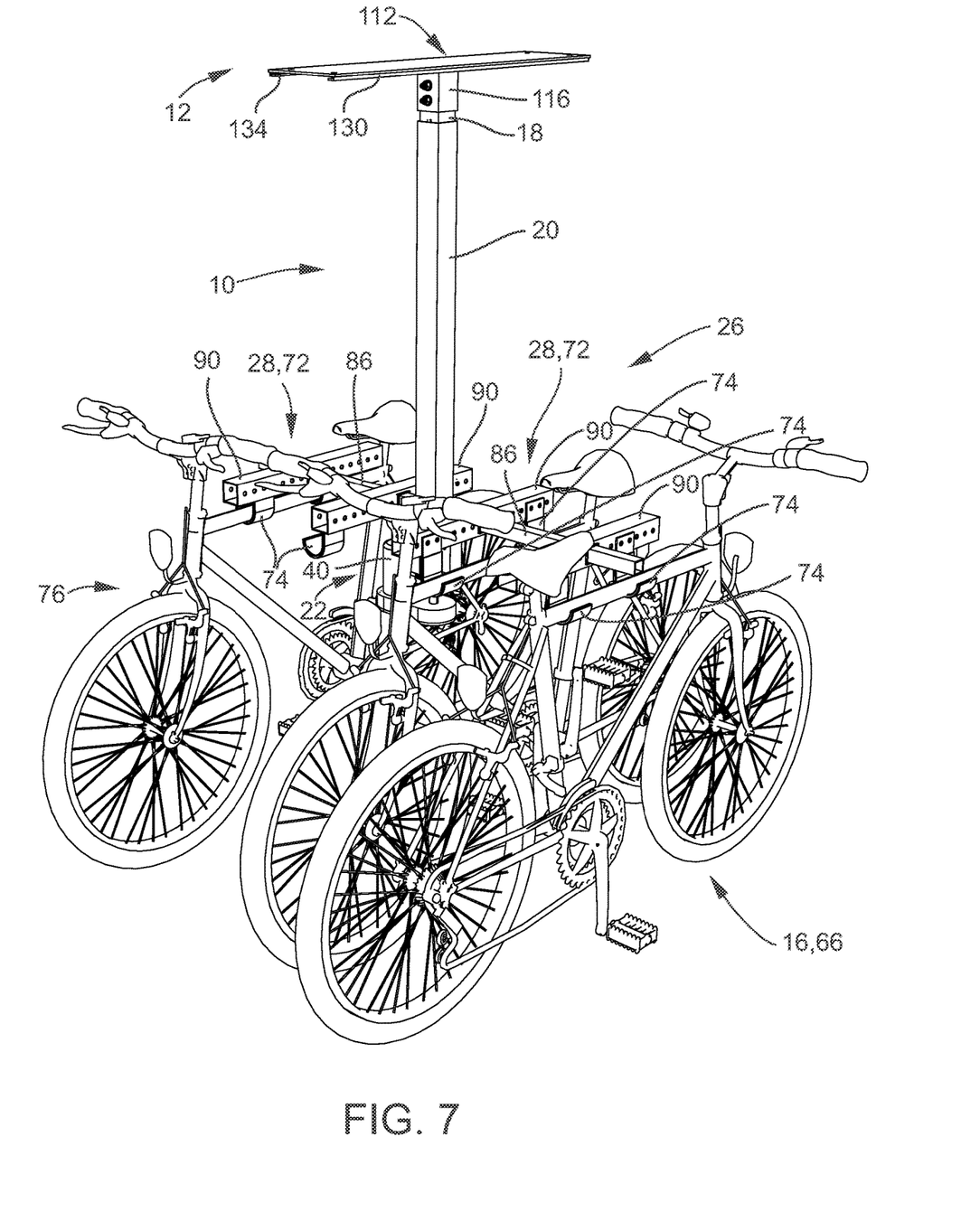
FIG. 7 is an environmental front perspective view of the telescoping ceiling mounted storage or bike rack according to select embodiments of the instant disclosure with j-hook mounting pieces with 3 bikes stored thereon.

Referring now specifically to FIGS. 4, 5 and 7, another feature of telescoping ceiling mounted storage or bike rack 10 may be that each of the at least one mounting brackets 28 may be configured for holding at least one bike 66. However, the disclosure is not so limited to bikes 66 as payload 16, and mounting brackets 28 of telescoping ceiling mounted storage or bike rack 10 may be designed and configured to hold and store any desired items or objects. In select embodiments, telescoping ceiling mounted storage or bike rack 10 may include two mounting brackets 28, wherein each of the two mounting brackets 28 are configured to hold two bikes 66. Whereby, telescoping ceiling mounted storage or bike rack 10 may be configured to hold four bikes 66.

Referring now specifically to FIGS. 1, 2, 4, 5 and 6, in select embodiments of telescoping ceiling mounted storage or bike rack 10, the at least one mounting brackets 28 may include at least one rounded bracket arm 68. Each of the at least one rounded bracket arms 68 may be configured to hold at least one bike 66 in vertical position 70. In select embodiments, each of the at least one rounded bracket arms 68 may include horizontal center rod 78, downward mounting bar 80, and tubular surface 84. Downward mounting bar 80 may be attached to mounting end 82 of horizontal center rod 78. Downward mounting bar 80 may be configured to mount rounded bracket arm 68 into one of the mounting receptacles 56 on second down-post section 20. Tubular surface 84 may be positioned over horizontal center rod 78 and may be configured for holding the at least one bike 66 thereon safely without scratching the at least one bike 66 held thereon. In select embodiments, tubular surface 84 may include a cushioned or padded tubular surface 84.

Referring now to FIGS. 6 and 7, in select embodiments of telescoping ceiling mounted storage or bike rack 10, the at least one mounting brackets 28 may include at least one j-hook bracket 72. Each of the at least one j-hook brackets 72 may include a pair of adjustable j-hooks 74 for each of the at least one bikes 66. Wherein, each of the at least one j-hook brackets 72 may be configured to hold the at least one bikes 66 in horizontal position 76. In select embodiments, each of the at least one j-hook brackets 72 may include horizontal support bar 86, downward mounting bar 80 (similar to downward mounting bar 80 of rounded bracket arm 68 described above), and at least one transverse horizontal bar 90. Downward mounting bar 80 may be attached to mounting end 88 of horizontal support bar 86. Downward mounting bar 80 may be configured to mount j-hook bracket 72 into one of the mounting receptacles 56 on the second down-post section 20. The at least one transverse horizontal bar 90 may be provided for each bike mounted on the at least one j-hook bracket 72. Each of the at least one transverse horizontal bars 90 may include center opening 92, plurality of holes 94, first j-hook 96, and second j-hook 100. Center opening 92 may be configured to receive horizontal support bar 86. Whereby, each of the transverse horizontal bars 90 may move along said horizontal support bar 86, like for adjusting distance 106 between adjacent transverse horizontal bars 90 and bikes 66 positioned thereon. The plurality of holes 94 may be on each side of center opening 92. The first j-hook 96 may be configured to be attached to one of the plurality of holes 94 on left side 98 of center opening 92. Second j-hook 100 may be configured to be attached to one of the plurality of holes 94 on a right side 102 of center opening 92. Whereby, each of the at least one j-hook brackets 72 may be adjustable by adjusting width 104 between first j-hook 96 and second j-hook 100, and/or by adjusting distance 106 between a first transvers horizontal bar 90 and a second transverse horizontal bar 90. As such, each j-hook bracket 72 may be adjusted and configured to fit various size bikes 66.

Figure 1:
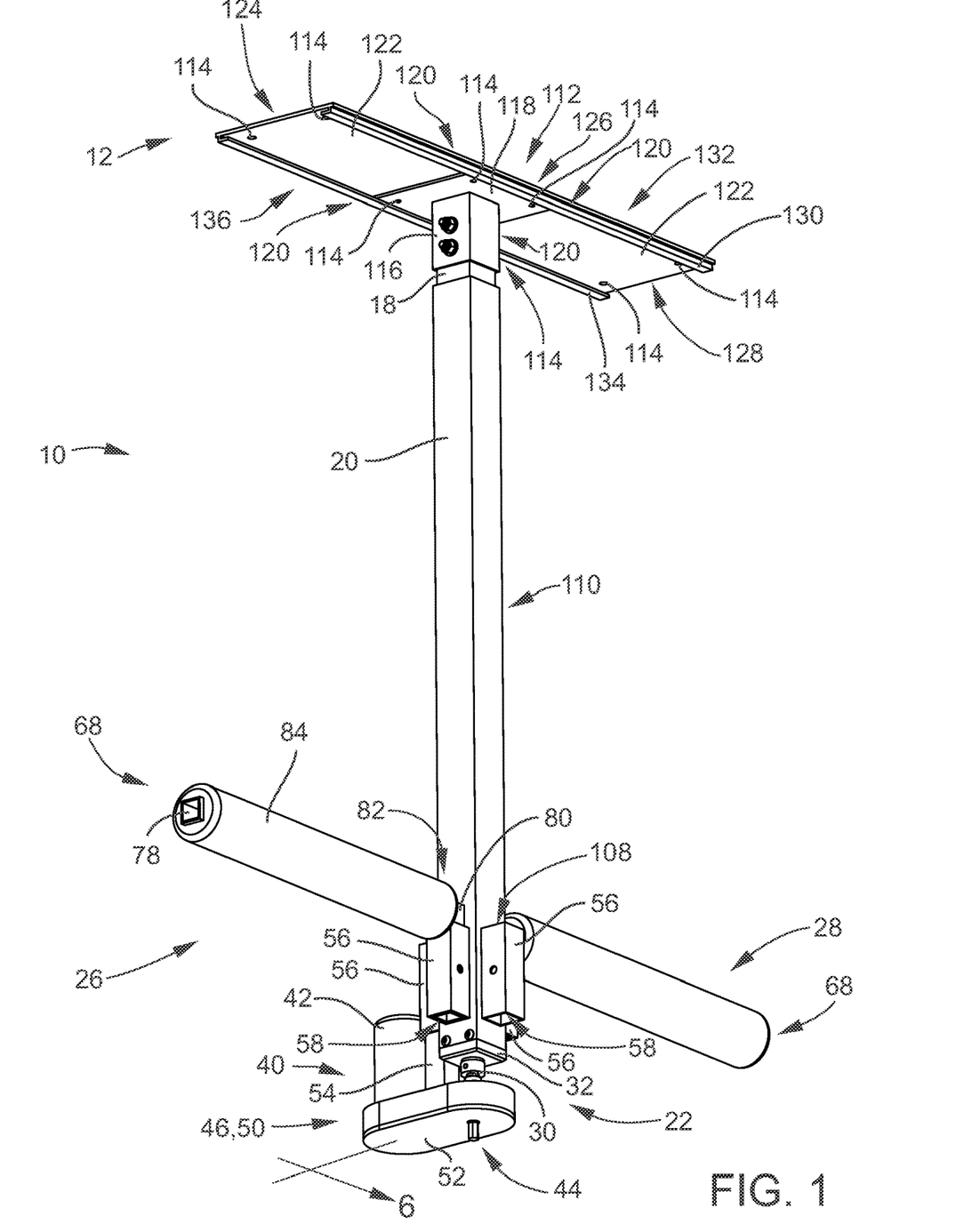
FIG. 1 is a front perspective view of the telescoping ceiling mounted storage or bike rack according to select embodiments of the instant disclosure with bar mounting pieces.
Figure 2A:
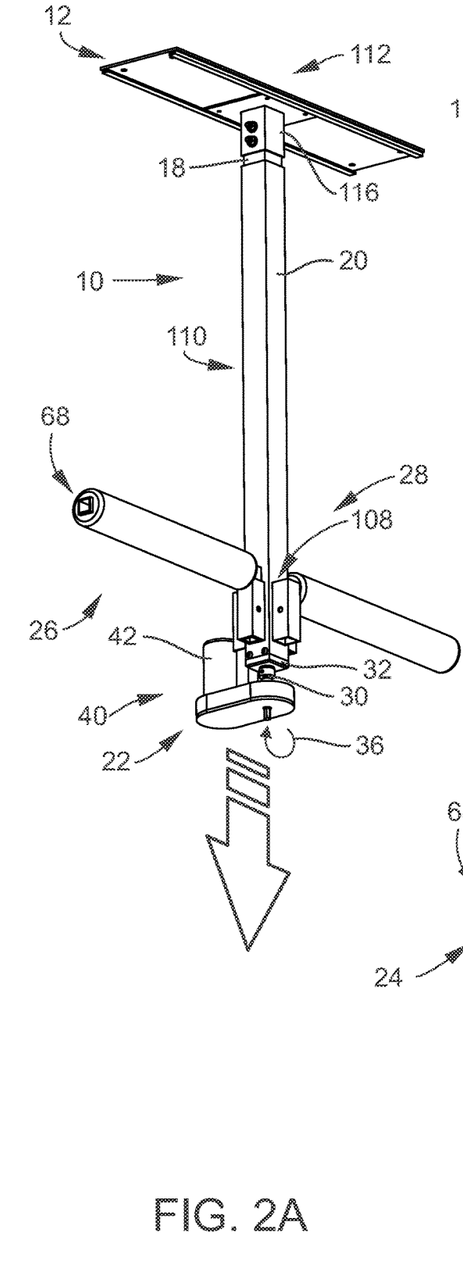
FIG. 2A is a front perspective view of the telescoping ceiling mounted storage or bike rack of FIG. 1 in the raised position moving downward.
Figure 2B:
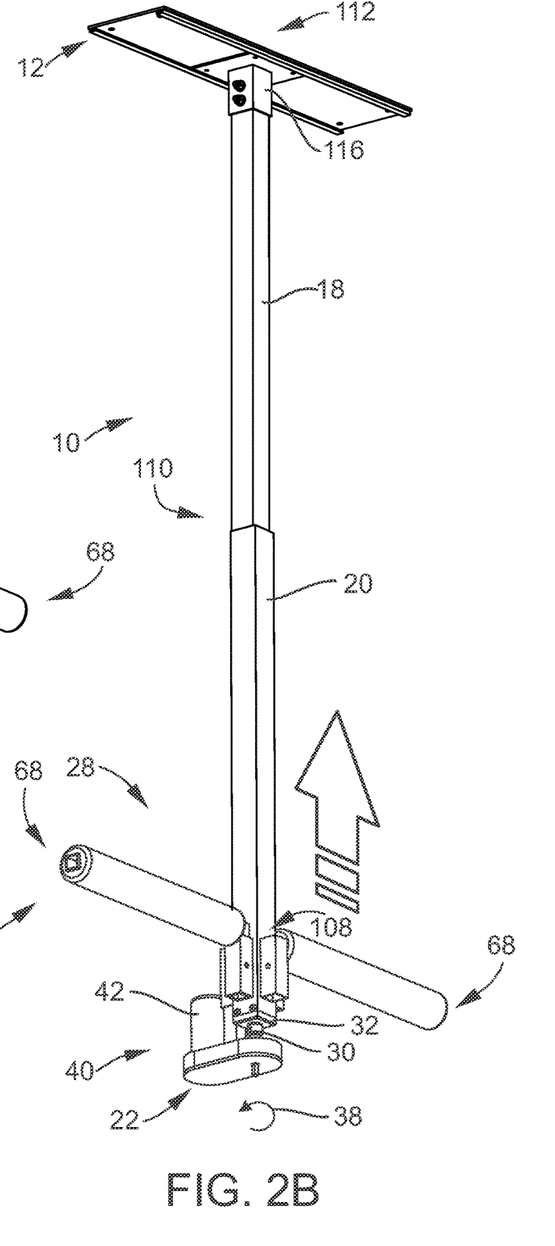
FIG. 2B is a front perspective view of the telescoping ceiling mounted storage or bike rack of FIG. 1 in the lowered position moving upward.

As best shown in FIGS. 1 and 6, another feature of telescoping ceiling mounted storage or bike rack 10 may be that second down-post section 20 can include four mounting receptacles 56. The four mounting receptacles 56 may be attached around second down-post section 20 near fixed bottom end 32. Each of the at least one mounting brackets 28 may include downward mounting bars 80 configured to be mounted in open top 108 of any of the four mounting receptacles 56 for positioning each of the at least one mounting brackets 28 on any side of second down-post section 20. In select embodiments, second down-post section 20 may include square shaped cross-section 110. Wherein, as shown in the Figures, each of the four mounting receptacles 56 may be positioned on each side of square shaped cross-section 110 of second down-post section 20. With this configuration, ceiling mounted storage rack 10 may include two mounting brackets 28 positioned on opposite sides of square shaped cross-section 110 of second down-post section 20 via two of the four mounting receptacles 56, and the raising and lowering mechanism 22 may be mounted to one of the other two mounting receptacles 56 not occupied by mounting brackets 28.

Ceiling mount 12 may be configured to attach to ceiling 14 and support payload 16 from ceiling 14. See FIGS. 1-7. Ceiling mount 12 may include any parts, means, mechanisms, or methods for attaching to ceiling 14 to support payload 16 from ceiling 14. Ceiling 14 may be any ceiling, including, but not limited to ceiling 14 of a shed, as shown in FIG. 4, ceiling 14 of a garage, as shown in FIG. 5, the like, etc. In select embodiments, ceiling mount 12 may include flat plate 112 and ceiling receptacle 116. Flat plate 112 may have plurality of mounting holes 114 configured for attaching ceiling mount 12 to ceiling 14. Ceiling receptacle 116 may be attached to flat plate 112 approximate its center. Ceiling receptacle 116 may be configured to receive and attach first down-post section 18 to ceiling mount 12. Center plate 118 may include ceiling receptacle 116 attached thereto and four of the mounting holes 114 approximate each corner 120 of center plate 118. In select embodiments, ceiling mount 112 may include stud plate 122. Stud plate 122 may be configured to be attached between studs in ceiling 14. Stud plate 122 may include two of the mounting holes 114 on first side 124 and two of the mounting holes 114 on second side 128. First rigid L-beam member 130 may be attached on first edge 132 of stud plate 122. Second rigid L-beam member 134 may be attached on second edge 136 of stud plate 122. Wherein, when stud plate 122 is attached to ceiling 14 via its four mounting holes 114, center plate 118 may be configured to be mounted to ceiling 14 by inserting center plate 118 between first rigid L-beam member 130 and second rigid L-beam member 134 at first side 124 or second side 128 of stud plate 122. Center plate 118 may then be slid along first rigid L-beam member 130 and second L-beam member 134 into desired position 126, where center plate 118 may be attached in desired position 126 via mounting holes 114 on center plate 118.

In another aspect, the instant disclosure embraces telescoping ceiling mounted storage rack 10 in any of the various embodiments and/or combination of embodiments shown and/or described herein. In select embodiments, ceiling mounted storage rack 10 may include at least two first down-post sections 18 attached to ceiling 14. Second down-post sections 20 may be telescopically configured with each of the first down-post sections 18. Each of the second down-post sections may be configured to slide up and down about the first down-post section 18 attached to ceiling 14. Raising and lowering mechanism 22 may be configured to move each of the second down-post sections 20 between lowered position 24 telescopically extended from first down-post sections 18 and raised position 26 telescopically recessed on or in first down-post section 18. In select embodiments, raising and lowering mechanism 22 may include threaded rods 30 in each of the telescoping sections configured to move second down-post sections 20 between lowered position 24 telescopically extended from first down-post sections 18 and raised position 26 telescopically recessed on or in first down-post sections 18. Each of the threaded rods 30 may be attached to fixed bottom end 32 of the second down-post section 20, where the threaded rod 30 may be configured to freely rotate within fixed bottom end 32 of the second down-post section 20. Each of the threaded rods 30 may be configured to engage threaded bottom end 34 of first down-post section 18. Wherein, when the threaded rod 30 is rotated, the threaded bottom end 34 of the first down-post section 18 may be configured to move along the threaded rod 30. Whereby, when each of the threaded rods 30 is rotated in first direction 36, second down-post sections 20 may be configured to telescopically extend from first down-post sections 18. And in reverse, when each of the threaded rods 30 is rotated in opposite second direction 38, second down-post sections 20 may be configured to telescopically recess onto first down-post sections 18. Whereby, with this configuration, ceiling mounted storage rack 10 may include multiple telescoping sections configured to simultaneously move between lowered position 24 and raised position 26 for raising and lowering payload 16.

In another aspect, the instant disclosure embraces telescoping ceiling mounted bike rack 10 in any of the various embodiments and/or combination of embodiments shown and/or described herein.

In sum, the present disclosure provides a telescoping ceiling mounted bike rack or storage rack 10 that uses a mechanical means to raise and lower payload 16 that could be motorized or left mechanical. The present disclosure embraces a ceiling mount with predrilled holes, downrods with hardpoints for payload brackets, threaded rod with bearing spacer, locking cap end with driver insert, a padded bracket arm for payloads, and the associated hardware. The unit has hard points for load bearing brackets that can be inserted and secured by bolt and nut. The outer sleeve of this device actually can flip and be used for different heights of ceilings and could have ADA capabilities as a storage device as well.

As such, a storage system is provided that can be lowered and raised without a ladder which could be used by folks with limitations or disabilities. Safer to install and creates multiple storage capabilities. Allows for easier and safer access to obtuse storage items. Kayak, bikes. Simple, affordable and is easy to ship.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A telescoping ceiling mounted storage rack comprising:
   a ceiling mount configured to attach to a ceiling and support a payload from the ceiling;
   a first down-post section attached to the ceiling mount;
   a second down-post section telescopically configured with the first down-post section, where the second down-post section is configured to slide up and down about the first down-post section attached to the ceiling;
   a raising and lowering mechanism configured to move the second down-post section between a lowered position telescopically extended from the first down-post section and a raised position telescopically recessed on or in the first down-post section;
   at least one mounting bracket attached to the second down-post section configured to hold the payload;
   wherein, each of the at least one mounting brackets is configured for holding at least one bike;
   wherein the at least one mounting brackets including:
      at least one rounded bracket arm configured to hold at least one of the bikes in a vertical position;
      at least one j-hook bracket with a pair of adjustable j-hooks for each of the at least one bikes configured to hold the at least one bikes in a horizontal position; or
      a combination thereof;
   wherein:
   each of the at least one rounded bracket arms including:
      a horizontal center rod;
      a downward mounting bar attached to a mounting end of the horizontal center rod, the downward mounting bar is configured to mount the rounded bracket arm into a mounting receptacle on the second down-post section; and
      a tubular surface positioned over the horizontal center rod configured for holding the at least one bike thereon safely without scratching the at least one bike held thereon;
   and
   each of the at least one i-hook brackets including:
      a horizontal support bar;
      the downward mounting bar attached to a mounting end of the horizontal support bar, the downward mounting bar is configured to mount the i-hook bracket into the mounting receptacle on the second down-post section; and
      at least one transverse horizontal bar, where one of the transverse horizontal bars is provided for each bike mounted on the at least one i-hook bracket, each of the at least one transverse horizontal bars including:

a center opening configured to receive the horizontal support bar, whereby, each of the transverse horizontal bars may move along said horizontal support bar via the center opening;

a plurality of holes on each side of the center opening;

a first j-hook configured to be attached to one of the plurality of holes on a left side of the center opening; and a second j-hook configured to be attached to one of the plurality of holes on a right side of the center opening; and whereby, each of the at least one j-hook brackets is adjustable by adjusting a width between the first j-hook and the second j-hook, by adjusting a distance between a first transvers horizontal bar and a second transverse horizontal bar, or combinations thereof.

2. The telescoping ceiling mounted storage rack of claim 1, wherein, when the payload is held on the at least one mounting bracket, the telescoping ceiling mounted storage rack is configured to move the payload between the lowered position and the raised position, where the lowered position is farther away from the ceiling than the raised position and the raised position is closer to the ceiling than the lowered position.

3. The telescoping ceiling mounted storage rack of claim 1, wherein the raising and lowering mechanism including a threaded rod configured to move the second down-post section between the lowered position telescopically extended from the first down-post section and the raised position telescopically recessed on or in the first down-post section.

4. The telescoping ceiling mounted storage rack of claim 3, wherein:

the threaded rod is attached to a fixed bottom end of the second down-post section, where the threaded rod is configured to freely rotate within the fixed bottom end of the second down-post section;

the threaded rod is configured to engage a threaded bottom end of the first down-post section, wherein, when the threaded rod is rotated, the threaded bottom end of the first down-post section is configured to move along the threaded rod;

whereby, when the threaded rod is rotated in a first direction, the second down-post section is configured to telescopically extend from the first down-post section, and when the threaded rod is rotated in an opposite second direction, the second down-post section is configured to telescopically recess onto the first down-post section.

5. The telescoping ceiling mounted storage rack of claim 4, wherein the raising and lowering mechanism further comprising a drive mechanism configured to rotate the threaded rod in both the first direction and the opposite second direction, whereby the drive mechanism is configured for moving the payload between the lowered position and the raised position.

6. The telescoping ceiling mounted storage rack of claim 5, wherein the drive mechanism including a motor or a manually operated mechanism.

7. The telescoping ceiling mounted storage rack of claim 6, wherein the motor including a power source including a wired powered source, a battery powered source, or a combination thereof.

8. The telescoping ceiling mounted storage rack of claim 4, wherein the raising and lowering mechanism including:

a motor configured to rotate the threaded rod in both the first direction and the opposite second direction, whereby the motor is configured for moving the payload between the lowered position and the raised position;

a motor mount configured to house and mount the motor to rotate the threaded rod, the motor mount including an upward mounting bar extending upward from the motor mount, the upward mounting bar is configured to be attached to a mounting receptacle attached to the second down-post section approximate the fixed bottom end of the second down-post section, where the upward mounting bar extends into an open bottom of the mounting receptacle;

the motor mount including a first gear, a second gear and a third gear, where the first gear is attached to the motor, the third gear is attached to the threaded rod, and the second gear is positioned between the first gear and the third gear and configured for translating rotation from the motor to the threaded rod via the first gear and the third gear.

9. The telescoping ceiling mounted storage rack of claim 8, wherein the second down-post section including four mounting receptacles attached around the second down-post section near the fixed bottom end, whereby the motor mount is configured to be mounted in any of the four mounting receptacles for positioning the motor on any side of the second down-post section via the upward mounting bar extending into the open bottom of any of the four mounting receptacles.

10. The telescoping ceiling mounted storage rack of claim 1 comprising two mounting brackets, wherein each of the two mounting brackets are configured to hold two bikes, whereby, the telescoping ceiling mounted storage rack is configured to hold four bikes.

11. The telescoping ceiling mounted storage rack of claim 1, wherein the second down-post section including four mounting receptacles attached around the second down-post section near a fixed bottom end, where each of the at least one mounting brackets including downward mounting bars configured to be mounted in an open top of any of the four mounting receptacles for positioning each of the at least one mounting brackets on any side of the second down-post section.

12. The telescoping ceiling mounted storage rack of claim 11, wherein the second down-post section including a square shaped cross-section, wherein each of the four mounting receptacles are positioned on each side of the square shaped cross-section of the second down-post section, wherein, the ceiling mounted storage rack including two mounting brackets positioned on opposite sides of the square shaped cross-section of the second down-post section via two of the four mounting receptacles, and the raising and lowering mechanism is mounted to one of the other two mounting receptacles.

13. The telescoping ceiling mounted storage rack of claim 1, wherein the ceiling mount including:

a flat plate with a plurality of mounting holes configured for attaching the ceiling mount to the ceiling;

a ceiling receptacle attached to the flat plate approximate its center, the ceiling receptacle is configured to receive and attach the first down-post section to the ceiling mount.

14. The telescoping ceiling mounted storage rack of claim 13, wherein the flat plate of the ceiling mount including:

a center plate including the ceiling receptacle attached thereto and four of the mounting holes approximate each corner of the center plate;
a stud plate configured to be attached between studs in the ceiling, the stud plate including two of the mounting holes on a first side and two of the mounting holes on a second side;
a first rigid L-beam member attached on a first edge of the stud plate; and
a second rigid L-beam member attached on a second edge of the stud plate;
wherein, when the stud plate is attached to the ceiling via its four mounting holes, the center plate is configured to be mounted to the ceiling by inserting the center plate between the first rigid L-beam member and the second rigid L-beam member at the first side or the second side of the stud plate, sliding the center plate along the first rigid L-beam member and the second L-beam member into a desired position, and attaching the center plate in the desired position via the mounting holes on the center plate.

15. A telescoping ceiling mounted storage rack comprising:
    at least two first down-post sections attached to a ceiling;
    a second down-post section telescopically configured with each of the first down-post sections, where the second down-post sections are configured to slide up and down about the first down-post sections attached to the ceiling;
    a raising and lowering mechanism configured to move the second down-post sections between a lowered position telescopically extended from the first down-post sections and a raised position telescopically recessed on or in the first down-post section, the raising and lowering mechanism including threaded rods configured to move the second down-post sections between the lowered position telescopically extended from the first down-post sections and the raised position telescopically recessed on or in the first down-post sections, wherein:
        each of the threaded rods is attached to a fixed bottom end of the second down-post section, where the threaded rod is configured to freely rotate within the fixed bottom end of the second down-post section;
        each of the threaded rods is configured to engage a threaded bottom end of the first down-post section, wherein, when the threaded rod is rotated, the threaded bottom end of the first down-post section is configured to move along the threaded rod;
    whereby, when each of the threaded rods is rotated in a first direction, the second down-post sections are configured to telescopically extend from the first down-post sections, and when each of the threaded rods is rotated in an opposite second direction, the second down-post sections are configured to telescopically recess onto the first down-post sections.

16. A telescoping ceiling mounted storage rack comprising:
    a ceiling mount configured to attach to a ceiling and support a payload from the ceiling;
    a first down-post section attached to the ceiling mount;
    a second down-post section telescopically configured with the first down-post section, where the second down-post section is configured to slide up and down about the first down-post section attached to the ceiling;
    a raising and lowering mechanism configured to move the second down-post section between a lowered position telescopically extended from the first down-post section and a raised position telescopically recessed on or in the first down-post section;
    at least one mounting bracket attached to the second down-post section configured to hold the payload;
    wherein the second down-post section including four mounting receptacles attached around the second down-post section near a fixed bottom end, where each of the at least one mounting brackets including downward mounting bars configured to be mounted in an open top of any of the four mounting receptacles for positioning each of the at least one mounting brackets on any side of the second down-post section; and
    wherein the second down-post section including a square shaped cross-section, wherein each of the four mounting receptacles are positioned on each side of the square shaped cross-section of the second down-post section, wherein, the ceiling mounted storage rack including two mounting brackets positioned on opposite sides of the square shaped cross-section of the second down-post section via two of the four mounting receptacles, and the raising and lowering mechanism is mounted to one of the other two mounting receptacles.

17. A telescoping ceiling mounted storage rack comprising:
    a ceiling mount configured to attach to a ceiling and support a payload from the ceiling;
    a first down-post section attached to the ceiling mount;
    a second down-post section telescopically configured with the first down-post section, where the second down-post section is configured to slide up and down about the first down-post section attached to the ceiling;
    a raising and lowering mechanism configured to move the second down-post section between a lowered position telescopically extended from the first down-post section and a raised position telescopically recessed on or in the first down-post section;
    at least one mounting bracket attached to the second down-post section configured to hold the payload; and
    wherein the ceiling mount including:
        a flat plate with a plurality of mounting holes configured for attaching the ceiling mount to the ceiling; and
        a ceiling receptacle attached to the flat plate approximate its center, the ceiling receptacle is configured to receive and attach the first down-post section to the ceiling mount;
    wherein the flat plate of the ceiling mount including:
        a center plate including the ceiling receptacle attached thereto and four of the mounting holes approximate each corner of the center plate;
        a stud plate configured to be attached between studs in the ceiling, the stud plate including two of the mounting holes on a first side and two of the mounting holes on a second side;
        a first rigid L-beam member attached on a first edge of the stud plate; and
        a second rigid L-beam member attached on a second edge of the stud plate;
        wherein, when the stud plate is attached to the ceiling via its four mounting holes, the center plate is configured to be mounted to the ceiling by inserting the center plate between the first rigid L-beam member and the second rigid L-beam member at the first side or the second side of the stud plate, sliding the center plate along the first rigid L-beam member and the second L-beam member into a desired position, and attaching the center plate in the desired position via the mounting holes on the center plate.

\* \* \* \* \*